United States Patent
Zhou et al.

(10) Patent No.: US 7,812,585 B2
(45) Date of Patent: Oct. 12, 2010

(54) ADVANCED CURRENT-MODE CONTROL FOR SWITCHED REGULATORS

(75) Inventors: Xunwei Zhou, San Jose, CA (US); Randy G. Flatness, Los Gatos, CA (US)

(73) Assignee: Linear Technology Corporation, Milipitas, CA (US)

( * ) Notice: Subject to any disclaimer, the term of this patent is extended or adjusted under 35 U.S.C. 154(b) by 591 days.

(21) Appl. No.: 11/802,960

(22) Filed: May 29, 2007

(65) Prior Publication Data

US 2008/0297122 A1 Dec. 4, 2008

(51) Int. Cl.
*G05F 1/40* (2006.01)
(52) U.S. Cl. ...................................... 323/284
(58) Field of Classification Search ................ 323/282, 323/283, 284, 285, 286, 288, 351
See application file for complete search history.

(56) References Cited

U.S. PATENT DOCUMENTS

| | | | |
|---|---|---|---|
| 5,734,258 A | 3/1998 | Esser | |
| 6,057,675 A * | 5/2000 | Tateishi | 323/283 |
| 6,304,066 B1 * | 10/2001 | Wilcox et al. | 323/282 |
| 6,456,051 B2 * | 9/2002 | Darzy | 323/284 |
| 6,580,258 B2 * | 6/2003 | Wilcox et al. | 323/282 |
| 6,819,154 B2 * | 11/2004 | Greenfeld | 327/172 |
| 7,449,869 B2 * | 11/2008 | Markowski | 323/283 |
| 2002/0017897 A1 * | 2/2002 | Wilcox et al. | 323/282 |
| 2005/0035748 A1 * | 2/2005 | Inn | 323/285 |
| 2005/0206358 A1 * | 9/2005 | Van Der Horn et al. | 323/282 |
| 2006/0176038 A1 | 8/2006 | Flatness et al. | |

FOREIGN PATENT DOCUMENTS

EP 1 689 070 A2 8/2006

OTHER PUBLICATIONS

International Search Report issued in International Patent Application No. PCT/US2008/063829, mailed Oct. 13, 2008.
Arbetter, B., et al., "Control Method for Low-Voltage DC Power Supply in Battery-Powered Systems With Power Management", 28th Annual IEEE Power Electronics Specialists Conference PESC '97 Record., Jun. 1997, pp. 1198-1204, vol. 2, IEEE.
Yang, X., et al., "A Novel Quasi-Constant Frequency Hysteretic Current Mode Control Approach", 34th Annual Power Electronics Specialists Conference PESC Proceedings '03, Jun. 2003, pp. 1147-1150, vol. 3, IEEE.
Transmittal of International Preliminary Report on Patentability issued in International Application No. PCT/US2008/063829 dated Dec. 10, 2009.

* cited by examiner

*Primary Examiner*—Adolf Berhane
(74) *Attorney, Agent, or Firm*—McDermott Will & Emery LLP

(57) ABSTRACT

A voltage regulator includes an input connectable to a voltage source and an output connectable to a load. The voltage regulator includes an inductor coupled to the output, a switch between the input and the inductor, and a current control loop configured to control the duty cycle of the switch to regulate voltage at the output, wherein the duty cycle being based on both a peak and valley threshold level of current flowing through the inductor.

30 Claims, 6 Drawing Sheets

ADVANCED CURRENT-MODE CONTROL FOR SWITCHED REGULATORS

BACKGROUND

1. Field

The present disclosure relates generally to switching regulators, and more particularly, to current-mode control for switching regulators.

2. Background

Voltage regulators are used to generate a constant voltage level from a supply voltage source. These voltage regulators are commonly implemented as either linear or switching regulators. A linear regulator provides closed loop control to regulate the voltage at the load. This type of regulator may be used to provide a constant voltage level which has a lower magnitude than the supply voltage source. A switching regulator is a circuit that uses an energy storage element, such as an inductor, to transfer energy from the supply voltage source to the load in discrete bursts. Feedback circuitry is used to regulate the energy transfer to maintain a constant voltage level at the load. Because the switching regulator operates to transfer energy in discrete bursts, it can be configured to step-up or step-down the voltage of the supply voltage source. A switching regulator that steps up the voltage is generally referred to as a "boost" converter and a switched regulator that steps down the voltage is generally referred to as a "buck" converter.

Switching regulators can employ either voltage-mode or current-mode control. Voltage-mode control regulators compare an compensated error voltage to a ramp to control the duty cycle of a switch that connects the supply voltage source to the storage element. The error voltage is derived from feedback circuitry that amplifies any difference between the output voltage level and a reference voltage. In contrast, current-mode control regulators use the current flowing through the switch to control the duty cycle of the switch. Two types of current-mode control regulators are commonly used today: peak current-mode and valley-current mode. For example, in a buck converter, the peak current-mode control regulator closes the switch with the rising edge of the clock and opens the switch when the peak current is sensed in the switch. A valley current-mode control regulator opens the switch with the rising edge of the clock and closes the switch when the valley current is sensed in the switch. The error voltage is used to control the peak or the valley current thresholds.

Current-mode control is considered by many to be the preferred way to regulate voltage. However, current-mode control techniques typically exhibit slow transient response due to clock latency. Another factor that limits the system bandwidth is the sampling effect, since current is only sampled once every clock cycle. Accordingly, there is a need in the art for current-mode control regulators that exhibit a better transient response.

SUMMARY

In accordance with one aspect of the disclosure, a voltage regulator includes an input connectable to a voltage source and an output connectable to a load. The voltage regulator further includes an inductor coupled to the output, a switch between the input and the inductor, and a current control loop configured to control the duty cycle of the switch to regulate voltage at the output, wherein the duty cycle being based on both a peak and valley threshold level of current flowing through the inductor.

In accordance with another aspect of the disclosure, a voltage regulator includes an input connectable to a voltage source and an output connectable to a load the voltage regulator further includes an inductor coupled to the output, a switch between the input and the inductor, a voltage control loop, a current sensor coupled to the inductor, and a pulse-width modulator having an output coupled to the switch, the pulse-width modulator further having a first input coupled to the current sensor, a second input coupled to the voltage control loop, a third input coupled to a signal generator configured to switch the output of the pulse-width modulator when the current flowing through the inductor reaches a peak threshold current level and when the current flowing through the inductor falls to a valley threshold current level.

In accordance with a further aspect of the disclosure, a voltage regulator includes an input connectable to a voltage source and an output connectable to a load. The voltage regulator further includes an inductor coupled to the output, a switch between the input and the inductor, a voltage control loop, a current sensor coupled to the inductor, a first pulse-width modulator having output, the first pulse-width modulator further having a first input coupled to the current sensor, a second input coupled to the voltage control loop, a third input coupled to a signal generator configured to switch the output of the first pulse-width modulator when the inductor flowing through the inductor reaches a peak threshold level, and a second pulse-width modulator having output, the second pulse-width modulator further having a first input coupled to the current sensor, a second input coupled to the voltage control loop, a third input coupled to a signal generator configured to switch the output of the second pulse-width modulator when the inductor flowing through the inductor falls to a valley threshold level.

In accordance with yet another aspect of the disclosure, a voltage regulator includes an input connectable to a voltage source and an output connectable to a load. The voltage regulator further includes means for storing energy coupled to the output, means for switching the input to the energy storing means, and means for controlling the duty cycle of the switching, means to regulate voltage at the output, the duty cycle being based on both a peak and valley threshold level of current flowing through the inductor.

In accordance with still another aspect of the disclosure, method of voltage regulation includes coupling a voltage source to a load through an inductor and allowing the inductor to the charge, removing the voltage source from the load when the current flowing through the inductor reaches a peak threshold level and allowing the inductor to discharge, and coupling the voltage source to the load through the inductor when the current flowing through the inductor falls to a valley threshold level and allowing the inductor to recharge, whereby a regulated voltage is provided to the load.

It is understood that other embodiments of the present invention will become readily apparent to those skilled in the art from the following detailed description, wherein it is shown and described only various embodiments of the invention by way of illustration. This current mode control architecture can be used in all the switching power regulators, such as boost, buck-boost, flyback, forward, sepic, etc. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a voltage regulator are illustrated by way of example, and not by way of limitation, in the accompanying drawings, wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. These structures and devices, as well as other blocks, modules, and circuits may be "coupled" together to perform various functions. The term "coupled" means either a direct connection, or where appropriate, an indirect connection (e.g., through intervening or intermediatry devices or other means).

Figure 1:
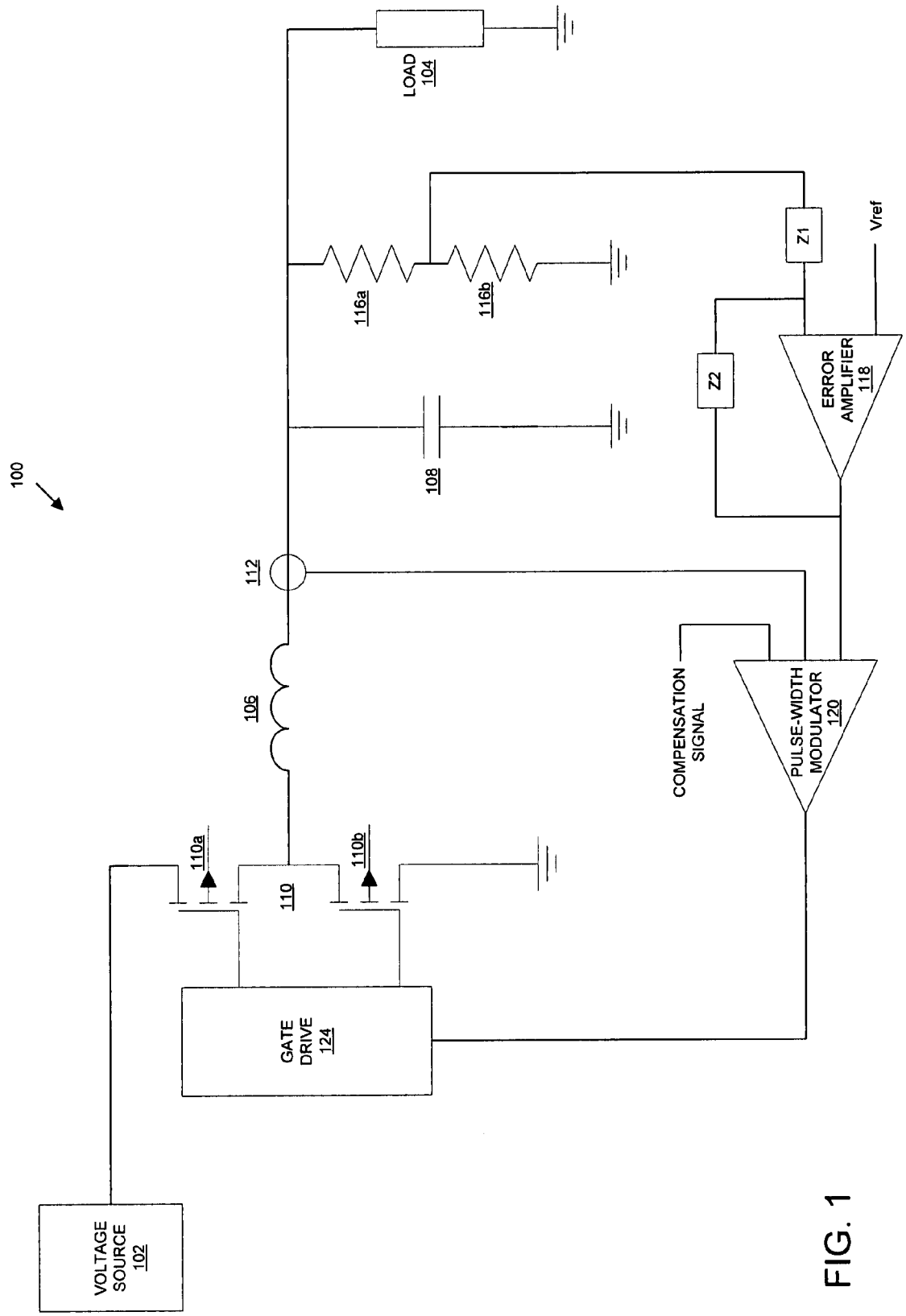
FIG. 1 is a schematic block diagram illustrating an exemplary embodiment of a voltage regulator.

FIG. 1 is a schematic block diagram illustrating an exemplary embodiment of a voltage regulator. The voltage regulator is shown as a buck converter 100, however, the various concepts described throughout this disclosure may be extended to other switching regulator designs, such as boost, buck-boost, flyback, forward, sepic, etc. as well as other suitable applications. Also, the control can be used for both synchronus and nonsynchronous switching regulators. The synchronous buck converter 100 includes an energy storage element that transfers energy from a supply voltage source 102 to a load 104 through a switch 110. In this example, the storage element is an L-C circuit and the switch is a CMOS switch 110, however, other suitable storage elements and switches may be used in other applications. The L-C circuit includes an inductor 106 and capacitor 108.

The transfer of energy from the supply voltage source 102 to the load 104 is a two step process. First, energy is transferred from the supply voltage source 102 to the storage element by turning on the high-side MOSFET 110a and turning off the low-side MOSFET 10b. In this state, the supply voltage source 102 provides the load current through the inductor 106. As the current rises, the inductor 106 begins to build up a charge in the form of a magnetic field. Next, the energy in the storage element is transferred to the load 104 by turning off the high-side MOSFET 110a and turning on the low-side MOSFET 110b. The inductor 106 continues to provide current to the load 104 by reversing its voltage. As the inductor's magnetic field collapses, the current through the inductor 106 falls until the energy transfer is completed. The capacitor 108 smooths out the changes in current through the inductor 106 into a constant voltage level at the output of the buck converter 100.

The buck converter 100 is shown in FIG. 1 as a current-mode control device, but is not limited to this embodiment. Current-mode control is a two-loop system with an inner current control loop and an outer voltage control loop. The purpose of the inner current control loop is to control the current flowing through the inductor 106. This is achieved with a current sensor 112 that controls the duty cycle of the CMOS switch 110. More specifically, the inner current control loop turns the high-side MOSFET 110a on and the low-side MOSFET transistor 110b off when the current through the inductor 106 drops below a "valley" threshold level, and turns off the high-side MOSFET 110a and turns on the low-side MOSFET 110b when the current through the inductor 106 rises above a "peak" threshold level. The valley and peak threshold levels are controlled by the outer voltage control loop.

The outer voltage control loop comprises an error amplifier 118 with compensation components Z1 and Z2. The error amplifier 118 generates an error signal representing the difference between the regulated voltage (i.e., the buck converter 100 output) and a reference voltage. In the example shown in FIG. 1, the regulated voltage is divided down by resistors 116a and 116b and the voltage reference $V_{ref}$ is set accordingly. The error signal output from the error amplifier 118 is used to adjust the valley and peak thresholds for the inner current control loop.

A pulse-width modulator 120 is used to provide a modulated square wave to a gate drive 124 for the CMOS switch 110. The modulated square wave is used to control the duty cycle the MOSFETS 110a, 110b, which correspondingly control the current through the load 104. In this example, the pulse-width modulator 120 compares the output from the current sensor 112 to the peak and valley current level thresholds set by the combined error signal and a compensation signal. The pulse-width modulator 120 changes state every time the current level sensed by the current sensor 112 crosses either the peak or valley current threshold. An example will now be described with reference to FIG. 2.

Figure 2:
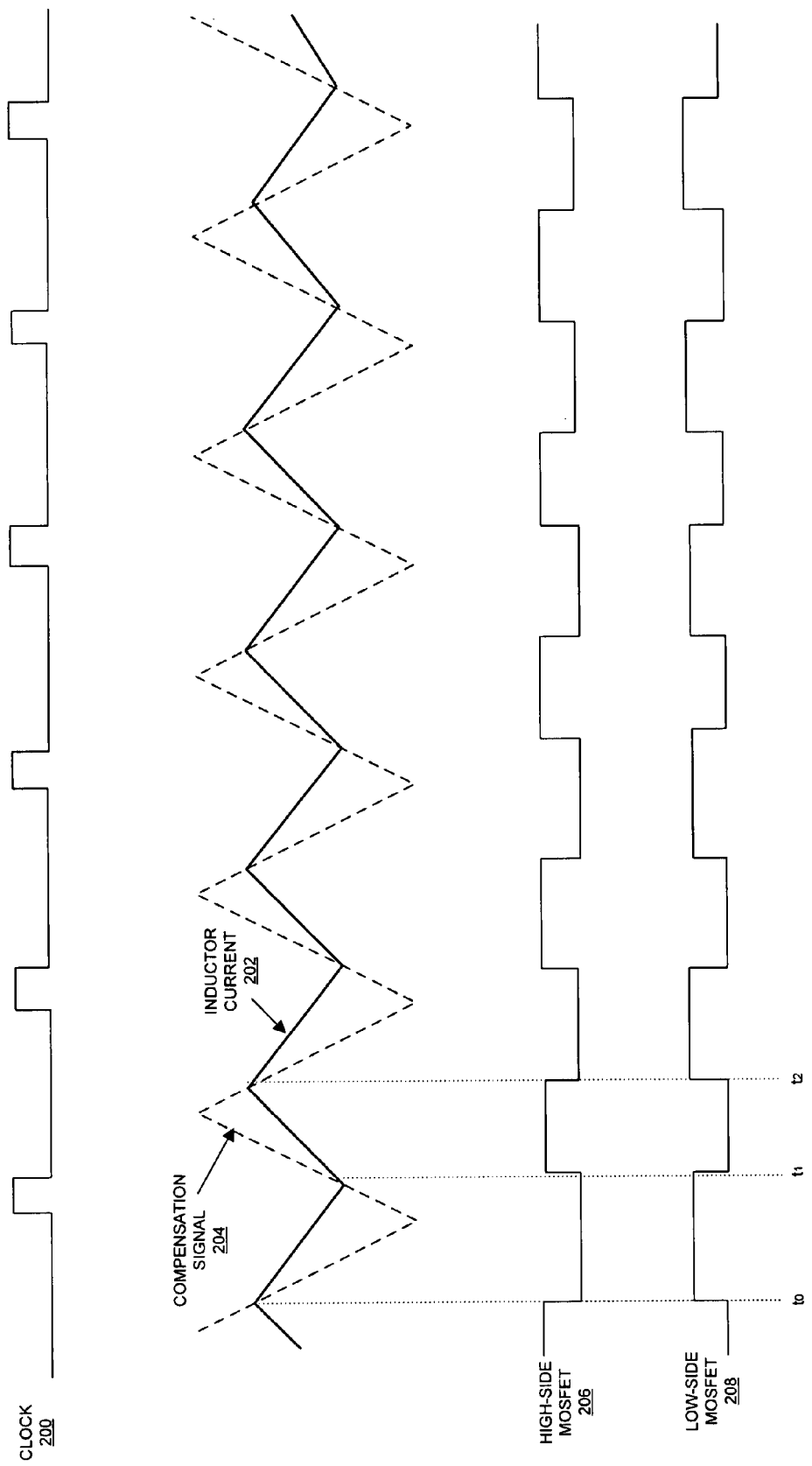
FIG. 2 is a timing diagram for an exemplary embodiment of a buck converter using current mode control.

FIG. 2 is a timing diagram showing the waveforms for the current mode control buck converter of FIG. 1. Referring to FIGS. 1 and 2, the timing diagram shows a waveform 202 representing the current flowing through the inductor 106. Superimposed on that waveform 202 is another waveform 204 representing a compensation signal combined with a modulation signal. Also shown in FIG. 2 is the state of the CMOS switch 110. In particular, the state of the high-side MOSFET 110a is shown by waveform 206 and the state of the low-side MOSFET 110b is shown by waveform 208. A high state means that the MOSFET is on and a low state means that the MOSFET is off. The timing diagram also includes a clock 200.

Referring to FIGS. 1 and 2, the high-side MOSFET 110a is on and the low-side MOSFET 110b is off prior to $t_0$, thereby connecting the supply voltage source 102 to the load 104 through the inductor 106. The current flowing through the inductor 106 (waveform 202) rises until it reaches a peak threshold level (waveform 204) at $t_0$. Once the peak threshold level is reached, the pulse-width modulator 120 changes state, causing the gate drive 124 to turn off the high-side MOSFET 110a (waveform 206) and turn on the low-side MOSFET 110b (waveform 208). The inductor 106 continues provide current to the load 104 by reversing its voltage. As the inductor's energy is dissipated, the current through the inductor 106 (waveform 202) falls. At $t_1$, the inductor current falls to a valley threshold level (waveform 204). When this occurs, the pulse-width modulator 120 again changes state, causing the gate drive 124 to turn on the high-side MOSFET 110a (waveform 206) and turn off the low-side MOSFET 110b (waveform 208). The supply voltage source 102 is again connected to the load 104 through the inductor 106. As a result, the current through the inductor 106 (waveform 202) rises again until it reaches the peak threshold level at $t_2$. The operation of the buck converter 100 continues in this manner.

The buck converter 100 described thus far senses both peak and valley inductor current in every clock cycle. Because current is sensed twice every clock cycle, the sampling effect is improved and the closed loop bandwidth can be increased. Because both the peak and valley currents are used to control the duty cycle of the switch and none of switches' turn-on and turn-off are controlled by clock, the buck converter 100 can respond to load transients with no clock latency.

Figure 3:
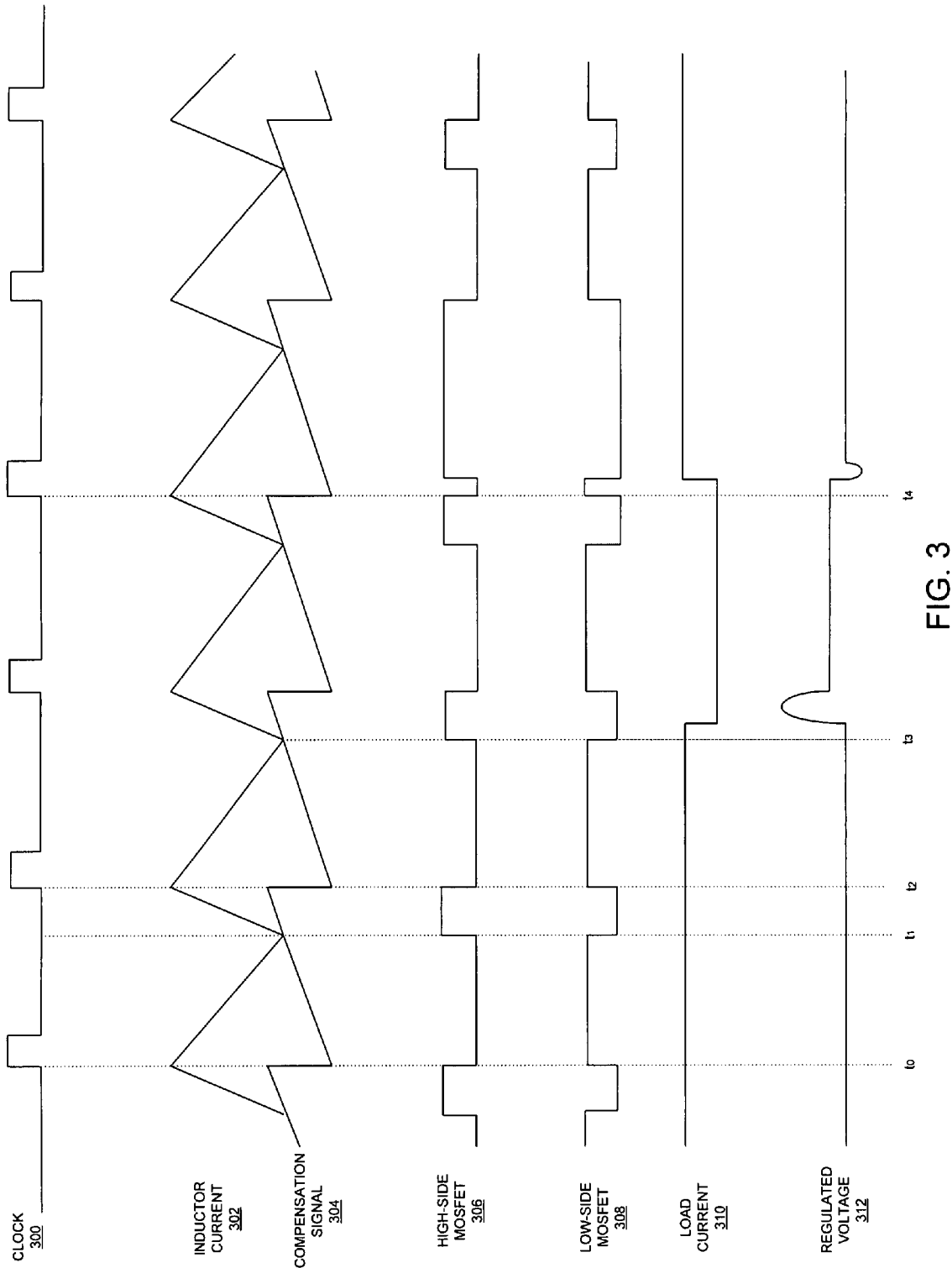
FIG. 3 is a timing diagram for an exemplary embodiment of a buck converter using valley current mode control.

To best understand how this approach eliminates clock latency, it is useful to look at the effects of load transients on a buck converter that senses only peak or valley inductor current. FIG. 3 is a timing diagram showing the waveforms for a current mode control buck converter 100 that uses only the valley inductor current to control the duty cycle of the CMOS switch 110. The timing diagram is similar to that described in connection with FIG. 2, with a waveform 302 representing the current flowing through the inductor 106 and a waveform 304 representing a compensation signal, which in this case is a ramp. Also shown in FIG. 3 is the state of the CMOS switch 110, with the state of the high-side MOSFET 110a being shown by waveform 306 and the state of the low-side MOSFET 110b being shown by waveform 308. The same convention used in FIG. 2 applies, with a high state being used to represent a MOSFET in an on state and a low state being used to represent a MOSFET in the off state. The timing diagram also includes a clock 300. The major difference between FIGS. 2 and 3 is that FIG. 3 also includes a waveform 310 showing the load current and waveform 312 showing the regulated voltage at the output of the buck converter 100.

Referring to FIG. 3, the high-side MOSFET 110a (waveform 306) is on and the low-side MOSFET 110b (waveform 308) is off prior to $t_0$, thereby connecting the supply voltage source 102 to the load 104 through the inductor 106. The current flowing through the inductor 106 (waveform 302) rises until the clock 300 at $t_0$. The clock 300 turns off the high-side MOSFET 110a (waveform 306) and turns on the low-side MOSFET 110b (waveform 308). The inductor 106 continues to provide current to the load 104 by reversing its voltage. As the inductor's energy is dissipated, the current through the inductor 106 falls until it reaches a valley threshold level (waveform 304) at $t_1$. At $t_1$, the pulse-width modulator 120 changes state, causing the gate drive 124 to turn on the high-side MOSFET 110a (waveform 306) and turn off the low-side MOSFET 110b (waveform 308). The supply voltage source 102 is again connected to the load 104 through the inductor 106. As a result, the current through the inductor 106 (waveform 302) rises until the next clock 300 at $t_2$. The process is repeated with the inductor current falling to a valley threshold level at $t_3$.

Immediately after $t_3$, the load current is suddenly reduced to what will be referred to as a "light load condition." If the high-side MOSFET 110a (waveform 306) is on and the low-side MOSFET 110b (waveform 308) is off when the transition occurs, as shown in FIG. 3, the current flowing through the inductor 106 will be dumped into the capacitor 108, causing a positive voltage spike in the regulated voltage (waveform 312) output from the buck converter 100. Following the voltage spike, an increase in the regulated voltage (waveform 312) is seen due to the reduced load current. If the light load condition were to persist for an extended period of time, the outer voltage control loop would generate an error signal that would adjust the DC level of the compensation ramp to decrease the duty cycle of the CMOS switch and bring the regulated voltage back within its specified limits. However, for simplicity of presentation, the load current is shown in FIG. 3 returning back to what will be referred to as a "heavy load condition" immediately after the clock 300 at $t_4$, thereby avoiding the need to describe the response of the outer voltage control loop to the light load condition.

Immediately after $t_4$, with the high-side MOSFET 110a (waveform 306) off and the low-side MOSFET 110b (waveform 308) on when the transition occurs, the capacitor 108 is forced to supply the additional current required by the load 104. This causes the regulated voltage (waveform 312) to drop. However, unlike the transition from the heavy-to-light load condition at $t_4$, the outer voltage control loop can respond without waiting for the next clock 300. Specifically, the drop in the regulated voltage causes an increase in the error signal generated by the error amplifier 118, which triggers the pulse-width modulator 120, thereby forcing the gate drive 124 to turn on the high-side MOSFET 110a (waveform 306) and turn off the low-side MOSFET 110b (waveform 308). With the high-side MOSFET 110a (waveform 306) in the on state, the sudden increase in current required by the load can be supplied by the supply voltage source 102 through the inductor 106, thereby reducing the demand on the capacitor 108. As a result, a negative voltage spike is seen in the regulated voltage (waveform 312), but it is significantly smaller than the positive voltage spike seen at $t_4$ because the outer voltage control loop can respond immediately to the transient load condition. The difference is more pronounced when the duty cycle of the high-side MOSFET 110a is high (i.e., the high-side MOSFET 110a is mostly in the on state) and the load current decreases shortly after the high-side MOSFET 110a is turned on because of the clock latency associated with the inner current control loop.

Figure 4:
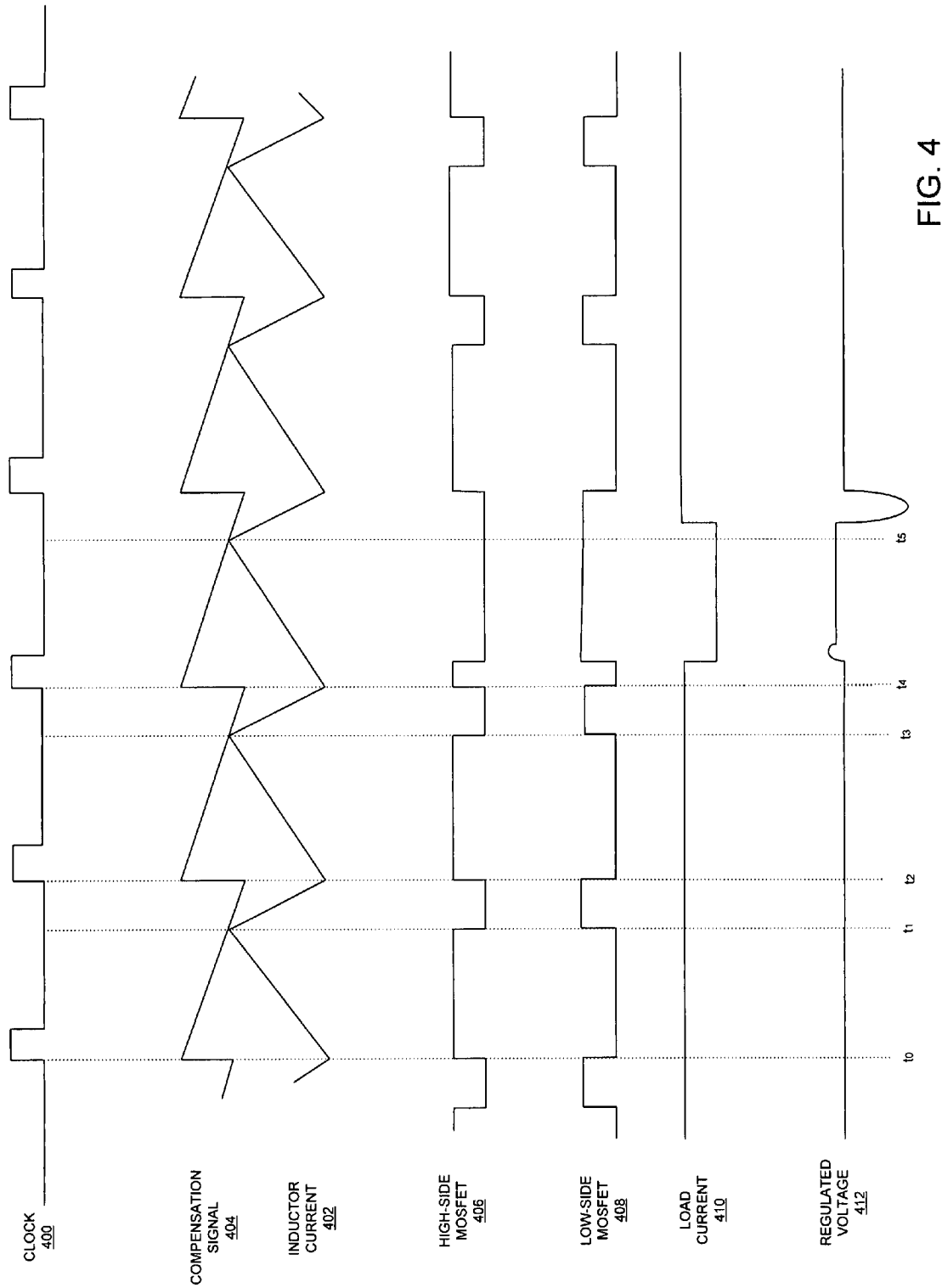
FIG. 4 is a timing diagram for an exemplary embodiment of a buck converter using peak current mode control.

A similar result is seen with a current mode control buck converter 100 that uses only the peak inductor current to control the duty cycle of the CMOS switch 10. FIG. 4 is a timing diagram that will be used to illustrate this result. Similar to FIG. 3, the timing diagram of FIG. 4 includes a waveform 402 representing the current flowing through the inductor 106 and a waveform 404 representing a compensation signal, which in this case is a ramp. Also shown in FIG. 4 is the state of the CMOS switch 110, with the state of the high-side MOSFET 110a being shown by waveform 406 and the state of the low-side MOSFET 110b being shown by waveform 408. The same convention used in FIGS. 2 and 3 apply, with a high state being used to represent a MOSFET in the on state and a low state being used to represent a MOSFET in the off state. The load current is shown by waveform 410 and the regulated voltage output from the buck converter 100 is shown by waveform 412. The timing diagram also includes a clock 400.

Referring to FIG. 4, the clock 400 turns on the high-side MOSFET 110a (waveform 406) and turns off the low-side MOSFET 110b (waveform 408) at $t_0$, thereby connecting the supply voltage source 102 to the load 104 through the inductor 106. The current flowing through the inductor 106 (waveform 402) rises until it reaches a peak threshold level established by waveform 404 at $t_1$. At $t_1$, the pulse-width modulator 120 changes state, causing the gate drive 124 to turn off the high-side MOSFET 110a (waveform 406) and turn on the low-side MOSFET 110b (waveform 408). The inductor 106 continues provide current to the load 104 by reversing its voltage. As the inductor's energy is dissipated, the current through the inductor 106 falls until the next clock at $t_2$. At $t_2$, the clock 300 turns on the high-side MOSFET 110a (waveform 406) and turns off the low-side MOSFET 110b (waveform 408), thereby again connecting to the supply voltage source 102 to the load 104 through the inductor 106. The process is repeated with the inductor current rising to a peak threshold level at $t_3$ and then falling to a valley threshold level at $t_4$.

Immediately after $t_4$, the load current is suddenly reduced to a light load condition. If the high-side MOSFET 110a (waveform 406) is on and the low-side MOSFET 110b (waveform 308) is off when the transition occurs, as shown in FIG. 4, the current flowing through the inductor 106 will be dumped into the capacitor 108, causing the regulated voltage (waveform 412) to rise. The outer voltage control loop responds to this voltage rise by increasing the error signal generated by the error amplifier 118. The error signal triggers the pulse-width modulator 120, thereby forcing the gate drive 124 to turn off the high-side MOSFET 110a (waveform 406) and turn on the low-side MOSFET 110b (waveform 408). With the high-side MOSFET 110a (waveform 406) in the off state, the capacitor 108 is no longer required to sink current from the supply voltage source 102. As a result, the regulated voltage (waveform 412) is quickly brought down within the specified limits, with a relatively small voltage spike seen at the output of the buck converter 100.

For simplicity of presentation, the load current is shown in FIG. 4 returning back to a heavy load condition immediately after the inductor current reaches the peak threshold level at $t_5$. If the high-side MOSFET 110a (waveform 406) is turned off and the low-side MOSFET 110b (waveform 408) is turned on when the transition occurs, as shown in FIG. 4, the capacitor 108 will be forced to supply the additional current required by the load 104. This results in a negative voltage spike at the output of the buck converter 100 (waveform 412). If the duty cycle of the high-side MOSFET 110a is low and the load current increases shortly after the high-side MOSFET 110a is turned off, then the negative voltage spike seen after $t_5$ may be significantly larger than the positive voltage spike seen after $t_4$ because the inner current control loop cannot react quickly enough due to clock latency. That is, the inner current control loop cannot react until the next clock 300.

This asymmetrical transient voltage spike often requires over design of output capacitance and bulky converter size. By sensing the peak and valley inductor current in every clock cycle, as described earlier in connection with FIG. 2, large voltage spikes due to clock latency can be eliminated. The elimination of clock latency is due to the fact that the outer voltage control loop can respond rapidly to both an increase and decrease in load current. An example will now be presented with reference to FIG. 5.

Figure 5:
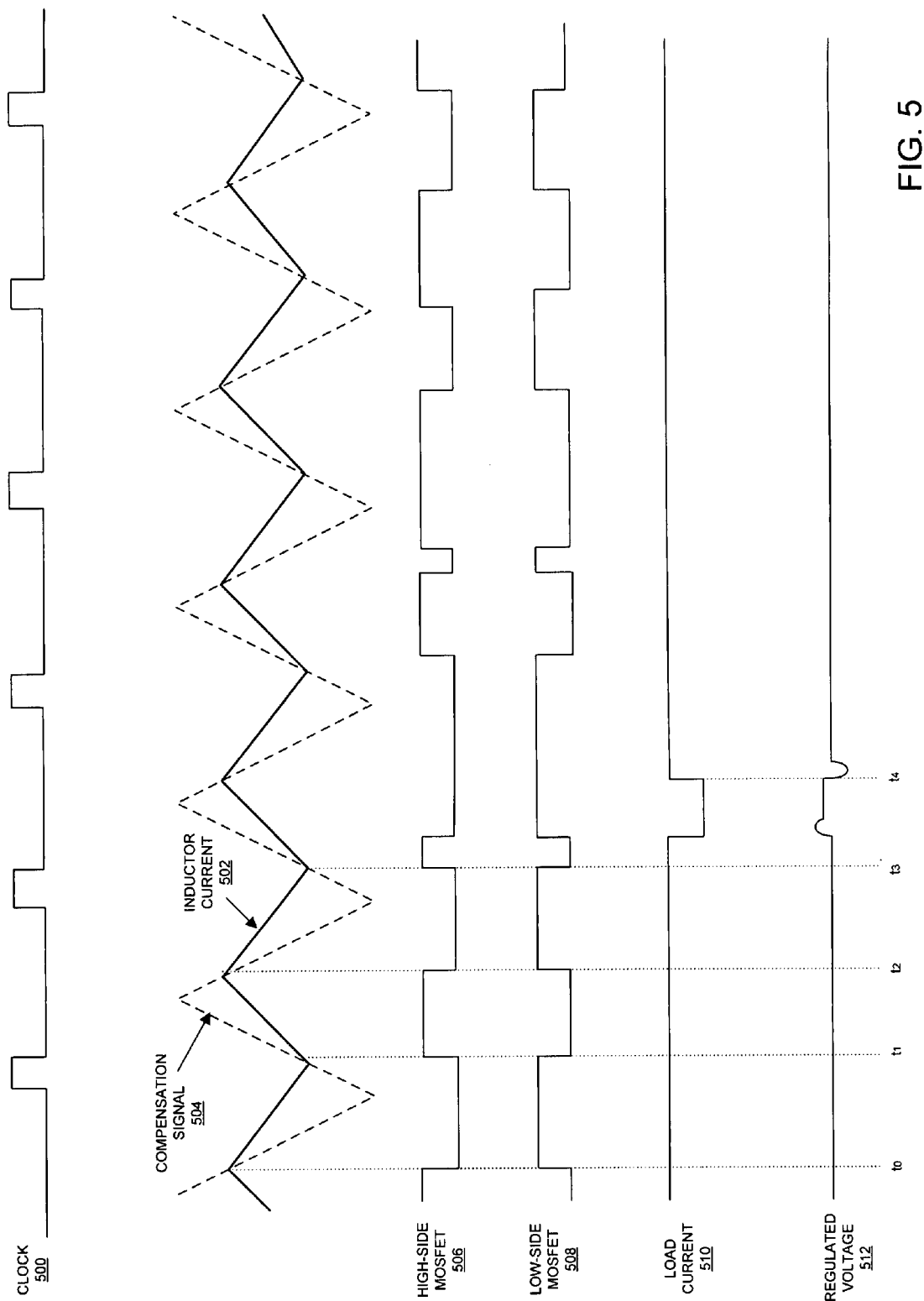
FIG. 5 is a further timing diagram for the exemplary embodiment of the buck converter in FIG. 2.

FIG. 5 is a timing diagram similar to FIG. 2, with the addition of a waveform 510 representing the load current and a waveform 512 representing the regulated voltage output from the buck converter 100. Referring to FIGS. 1 and 5, the current through the inductor 108 (waveform 502) is shown decreasing after $t_2$ until it reaches the valley threshold level (waveform 504) at $t_3$. When the inductor current falls to the valley threshold level, the pulse-width modulator 120 forces the high-side MOSFET 110a (waveform 506) on and the low-side MOSFET 110b (waveform 508) off via the gate drive 124. The supply voltage source 102 is again connected to the load 104, thereby causing the inductor current to rise.

Immediately after $t_3$, the load current (waveform 510) is reduced to a light load condition. As a result, the current flowing through the inductor 106 will be dumped into the capacitor 108, causing the regulated voltage (waveform 512) at the output of the buck converter to rise. The outer voltage control loop responds to this voltage rise by increasing the error signal generated by the error amplifier 118. The error signal triggers the pulse-width modulator 120, thereby forcing the gate drive 124 to turn off the high-side MOSFET 110a (waveform 506) and turn on the low-side MOSFET 110b (waveform 508). With the high-side MOSFET 110a (waveform 506) in the off state, the capacitor 108 is longer required to sink current from the supply voltage source 102. As a result, a small voltage positive spike is seen at the output of the buck converter 100 (waveform 512), with the regulated voltage quickly dropping to a new voltage, slightly higher than before due to the reduced load current.

A short time later, at $t_4$, the inductor current transitions to a heavy load condition. If the high-side MOSFET 110a (waveform 506) is turned off and the low-side MOSFET 110b (waveform 508) is turned on, as shown in FIG. 5, the capacitor must supply the additional current required by the load 104. This causes the regulated voltage (waveform 512) seen at the output of the buck converter 100 to drop, which causes an increase in the error signal generated by the error amplifier 118. The error signal triggers the pulse-width modulator 120 to change state, thereby forcing the gate drive 124 to turn on the high-side MOSFET 110a (waveform 506) and turn off the low-side MOSFET 110b (waveform 508). With the high-side MOSFET 110a (waveform 506) in the on state, the increase in current required by the load can be supplied by the supply voltage source 102 through the inductor 106, thereby reducing the demand on the capacitor 108. As a result, a small negative voltage spike is seen at the output of the buck converter 100 (waveform 512).

Figure 6:
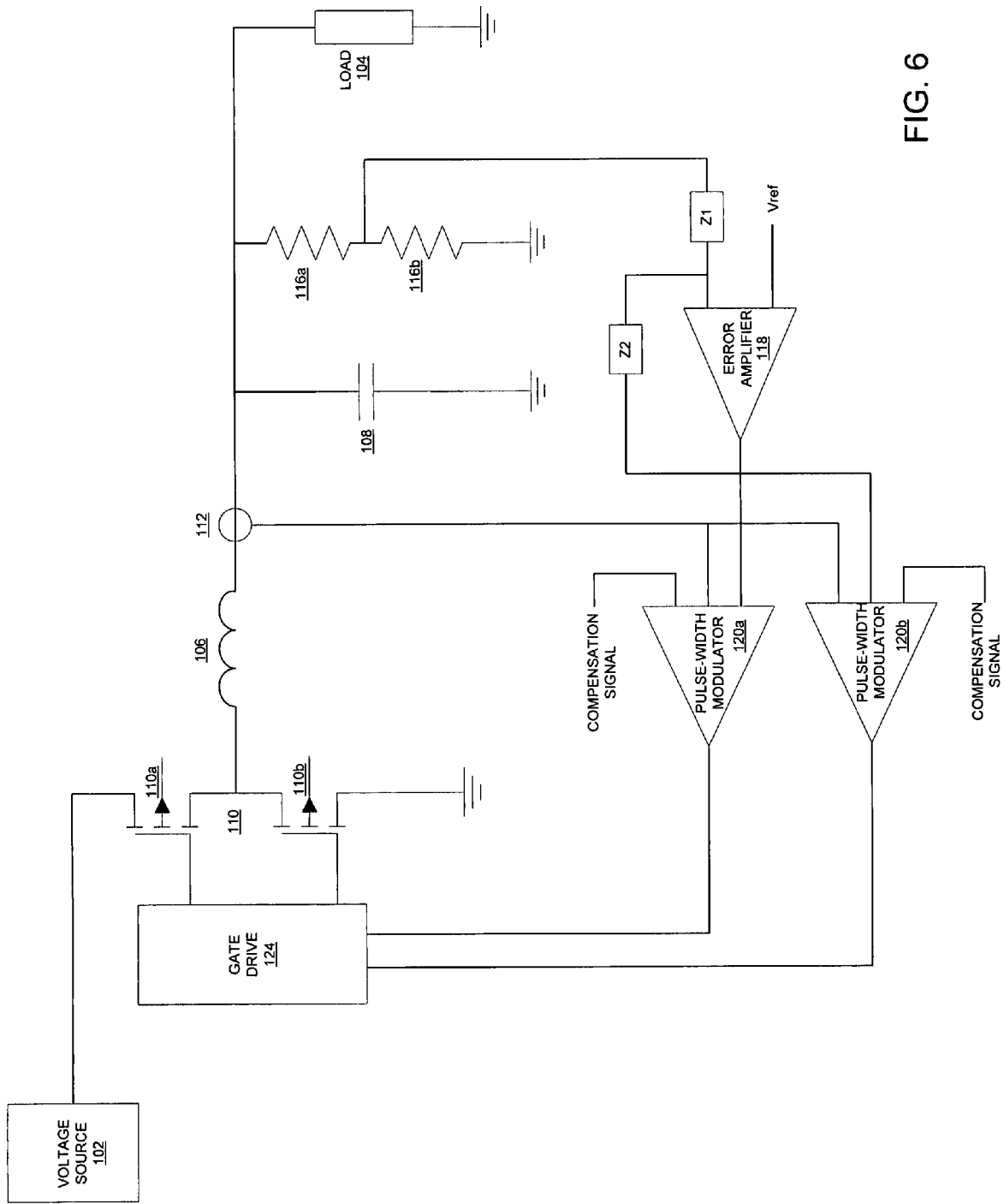
FIG. 6 is a schematic block diagram illustrating an alternative exemplary embodiment of a voltage regulator.

FIG. 6 is a schematic block diagram illustrating an example of an alternative embodiment of a voltage regulator. The voltage regulator is a buck converter similar to the one described in connection with FIG. 1. However, in this example, two pulse-width modulators 120a, 120b are used. The first pulse-width modulator 120a is triggered by the peak threshold level and the second pulse-width modulator 120b is triggered by the valley threshold level. Specifically, by feeding the appropriate polarity of the error signal into the first pulse-width modulator 120a with a negatively sloped compensation ramp, the first pulse-width modulator 120a can be configured to turn off the high-side MOSFET 110a and turn on the low-side MOSFET 110b when the current sensed by the current sensor 112 rises to the peak threshold level. Similarly, by feeding the opposite polarity of the error signal into the second pulse-width modulator 120b with a positively sloped compensation ramp, the second pulse-width modulator 120b can be configured to turn on the high-side MOSFET 110a and turn off the low-side MOSFET 110b when the current sensed by the current sensor 112 falls to the valley threshold level.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A voltage regulator having an input connectable to a voltage source and an output connectable to a load, comprising:
    an inductor coupled to the output;
    a switch between the input and the inductor; and
    a current control loop configured to control the duty cycle of the switch to regulate voltage at the output, the duty cycle being based on both peak and valley threshold levels of current flowing through the inductor.

2. The voltage regulator of claim 1 further comprising a capacitor coupled to the output.

3. The voltage regulator of claim 1 wherein the switch is configured to switch the inductor from the input to a return path when the current flowing through the inductor rises to the peak threshold level, and switch the inductor from the return path to the input when the current flowing through the inductor falls to the valley threshold level.

4. The voltage regulator of claim 1 further comprising a voltage control loop, the current control loop being configured to operate inside the voltage control loop, and wherein the peak and valley current threshold levels are set, at least in part, by the voltage control loop.

5. The voltage regulator of claim 4 wherein the voltage control loop is further configured to adjust the duty cycle of the switch, independent of any clock, in response to load transients.

6. The voltage regulator of claim 4 wherein the peak and valley current threshold level are set by the combined output from the voltage control loop and a compensation signal.

7. The voltage regulator of claim 6 wherein the current control loop comprises a current sensor configured to sense the current flowing through the inductor, the voltage regulator further comprising a pulse-width modulator configured to modulate a square wave to control the duty cycle of the switch by comparing the output from the current sensor to the peak and valley current threshold levels.

8. The voltage regulator of claim 7 wherein the compensation signal comprises a sawtooth.

9. The voltage regulator of claim 6 wherein the current control loop comprises a current sensor configured to sense the current flowing through the inductor, the voltage regulator further comprising first and second pulse-width modulators, the first pulse-width modulator being configured to modulate a first square wave by comparing the output from the current sensor to the peak current threshold level, and the second pulse-width modulator being configured to modulate a second square wave by comparing the output from the current sensor to the valley current threshold level, the modulated first and second square waves being used to control the duty cycle of the switch.

10. The voltage regulator of claim 9 wherein the switch is configured to switch the inductor from the input to a return path based on the modulated first square wave, and switch the inductor from the return path to the input based on the modulated second square wave.

11. A voltage regulator having an input connectable to a voltage source and an output connectable to a load, comprising:
    an inductor coupled to the output;
    a switch between the input and the inductor;
    a voltage control loop;
    a current sensor coupled to the inductor; and
    a pulse-width modulator having an output coupled to the switch, the pulse-width modulator further having a first input coupled to the current sensor, a second input coupled to the voltage control loop, a third input coupled to a signal generator configured to switch the output of the pulse-width modulator when the current flowing through the inductor reaches a peak threshold current level and when the current flowing through the inductor falls to a valley threshold current level.

12. The voltage regulator of claim 11 further comprising a capacitor coupled to the output.

13. The voltage regulator of claim 11 wherein the switch comprises a first transistor between the input and the inductor and a second transistor between the inductor and a return path.

14. The voltage regulator of claim 11 wherein the voltage control loop comprises a voltage divider network coupled to the output, and an error amplifier having a first input coupled to the voltage divider network, a second input coupled to a reference voltage, and an output coupled to the second input of the pulse-width modulator.

15. A voltage regulator having an input connectable to a voltage source and an output connectable to a load, comprising:
    an inductor coupled to the output;
    a switch between the input and the inductor;
    a voltage control loop;
    a current sensor coupled to the inductor;
    a first pulse-width modulator having an output, the first pulse-width modulator further having a first input coupled to the current sensor, a second input coupled to the voltage control loop, and a third input coupled to a signal generator configured to switch the output of the first pulse-width modulator when current flowing through the inductor reaches a peak threshold level; and
    a second pulse-width modulator having an output, the second pulse-width modulator further having a first input coupled to the current sensor, a second input coupled to the voltage control loop, and a third input coupled to a signal generator configured to switch the output of the second pulse-width modulator when the current flowing through the inductor falls to a valley threshold level.

16. The voltage regulator of claim 15 wherein the first ramp generator is configured to generate a ramp having a positive slope, and the second ramp generator is configured to generate a ramp having a negative slope.

17. The voltage regulator of claim 15 further comprising a capacitor coupled to the output.

18. The voltage regulator of claim 15 wherein the switch comprises a first transistor between the input and the inductor and a second transistor between the inductor and a return path.

19. The voltage regulator of claim 15 wherein the voltage control loop comprises a voltage divider network coupled to the output, and an error amplifier having a first input coupled to the voltage divider network, a second input coupled to a reference voltage, and an output coupled to the second input of the first and second pulse-width modulators.

20. A voltage regulator having an input connectable to a voltage source and an output connectable to a load, comprising:

means for storing energy coupled to the output;

means for switching the input to the energy storing means; and means for controlling the duty cycle of the switching means to regulate voltage at the output, the duty cycle being based on both peak and valley threshold levels of current flowing through the inductor.

21. The voltage regulator of claim 20 wherein the switching means comprises means for switch the energy storing means from the input to a return path when the current flowing through the inductor rises to the peak threshold level, and means for switching the energy storing means from the return path to the input when the current flowing through the inductor falls to the valley threshold level.

22. The voltage regulator of claim 20 further comprising means for setting the peak and valley current threshold levels.

23. The voltage regulator of claim 20 further comprising means for adjusting the duty cycle of the switching means, independent of any clock, in response to load transients.

24. A method of voltage regulation, comprising:

coupling a voltage source to a load through an inductor and allowing the inductor to charge;

removing the voltage source from the load when the current flowing through the inductor reaches a peak threshold level and allowing the inductor to discharge; and coupling the voltage source to the load through the inductor when the current flowing through the inductor falls to a valley threshold level and allowing the inductor to recharge;

whereby a regulated voltage is provided to the load.

25. The method of claim 24 further comprising smoothing out the changes in the current flowing through the inductor to provide the regulated voltage to the load.

26. The method of claim 24 further comprising removing the voltage source from the load in response to a decrease in load current, independent of any clock, and coupling the voltage source to the load through the inductor in response to an increase in load current, independent of any clock.

27. The method of claim 24 further comprising setting the peak and valley current threshold levels.

28. The method of claim 27 wherein the peak and valley current threshold levels are set based, at least in part, on the regulated voltage provided to the load.

29. The method of claim 28 wherein the peak and valley current threshold levels are set based on the regulated voltage provided to the load and a compensation sawtooth.

30. The method of claim 28 wherein the peak and valley current threshold levels are set based on the regulated voltage provided to the load and first and second compensation ramps.

* * * * *